Aug. 3, 1937.  G. D. DILL  2,088,691
GAS AND LIQUID CONTACTING MEANS AND METHOD
Filed July 13, 1936  2 Sheets-Sheet 1
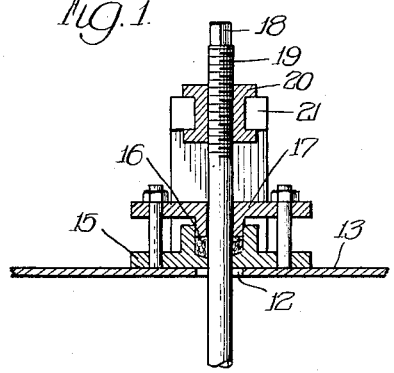
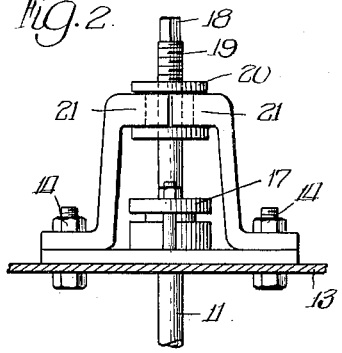
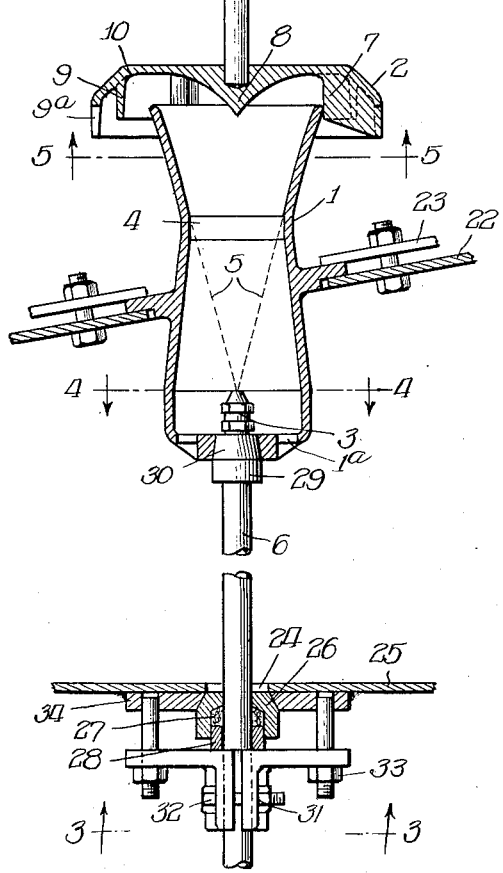
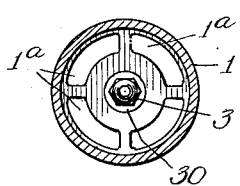
Inventor:
Gilbert D. Dill, Aug. 3, 1937.       G. D. DILL       2,088,691
GAS AND LIQUID CONTACTING MEANS AND METHOD
Filed July 13, 1936      2 Sheets-Sheet 2
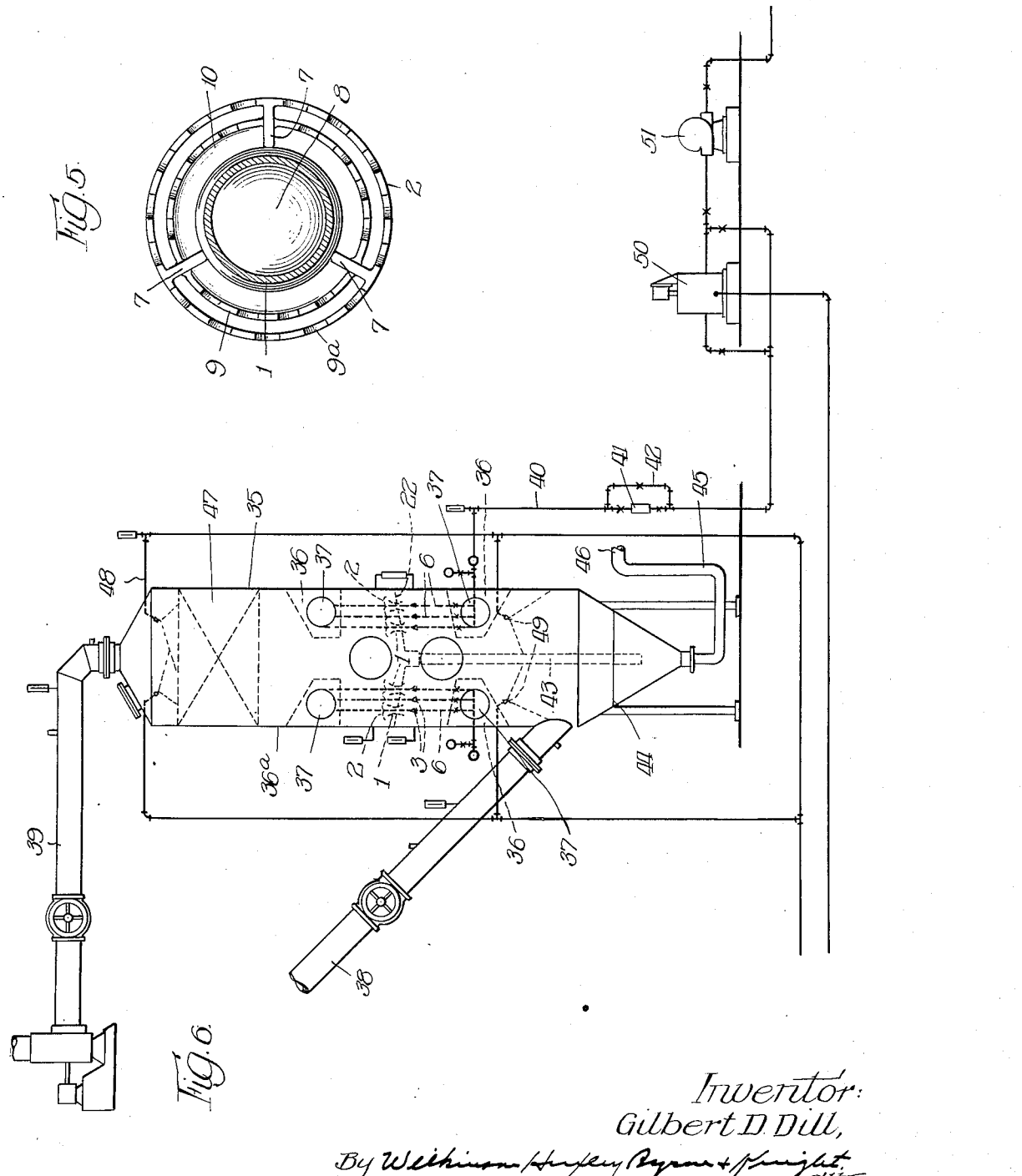
Inventor:
Gilbert D. Dill, Patented Aug. 3, 1937

2,088,691

UNITED STATES PATENT OFFICE 2,088,691

GAS AND LIQUID CONTACTING MEANS AND METHOD

Gilbert D. Dill, Cleveland, Ohio

Application July 13, 1936, Serial No. 90,280

20 Claims. (Cl. 261—116)

The present invention relates to improvements in gas and liquid contacting means and methods.

More particularly the present invention relates to means and methods for providing intimate contact between gas and liquids. The invention is applicable to many purposes including the cleaning of gases, the condensation of steam, oil vapors and other vapors, and the conditioning of air for rendering it more comfortable for occupants of homes, auditoriums and the like. As the description proceeds, many other uses will become apparent.

Referring to the cleaning of dust from blast furnace gas, many means and methods have been suggested and have been used including mechanical disintegrators in which the gas is mixed with water spray and the mixture beaten between moving bars in an attempt to wet the surface of the smallest dust particles. This mode of operation has the disadvantage of fairly high cost of original installation and high power consumption. Another method is by electrical precipitation. This method involves rather high first cost as well as high cost of upkeep. Other means and methods may be mentioned, but all concerning which applicant is informed involve the consumption of a very considerable amount of water per unit volume of gas treated.

The transfer of heat between liquids on the one hand and vapors or gases on the other hand seldom reaches a stage of high efficiency, principally because of poor contact between the liquid and the vapor or gas. This is demonstrated by the fact that the liquid in installations in service leaves the device at a much cooler temperature than should be the case with a high degree of efficiency in the apparatus.

An object of the present invention is to provide means for mixing liquids and gases in such a manner as to cause both to be minutely divided and intimately contacted with each other.

A further object is to provide an improved method of contacting liquid with gas or vapor in which the contacting operation is conducted at high velocity and in which the liquid is disposed of efficiently without interference with the contacting operation.

A further object is to provide an improved means and an improved method for intimately contacting liquid with gas or vapor in which the pressure drop will be a minimum.

A further object is to provide an improved mechanism and an improved method for providing intimate contact between liquid and the particles of gas or vapor which will meet the needs of commercial operation. As a corollary to the object last stated, a further object is to provide apparatus and a method of contacting liquid with particles of gas or vapor which will operate with high efficiency under overload conditions.

In carrying out the above stated objects, it is proposed to deliver a spray of water or other liquid at high velocity through a chamber or a plurality of chambers each having a throat therein, the sprays being so designed as to completely fill said throats. The gas or vapor to be treated is delivered in the same direction as the direction of liquid flow, and inasmuch as each of the throats of the various chambers is completely filled with liquid spray from the jets referred to, the gas or vapor under treatment must pass through said spray. A chamber having a double cone or Venturi-like throat is preferred. The invention contemplates the provision of deflector plates, preferably adjustable in relation to the outlet orifices of the various chambers. As will appear presently, the surface of each deflector adapted to be contacted by the liquid is streamlined to turn the course of the stream of gas and liquid away from the axis of the Venturi-like throat to prevent accumulation of the liquid to interfere with the action of the chamber.

Referring now to the drawings—

Figure 1 is a sectional view showing certain salient features of one embodiment of the present invention;

Figure 2 shows a detail of construction, said Figure 2 being taken in the direction of the arrow 2 of Figure 1;

Figure 3 is a sectional view taken along the plane indicated by the arrows 3—3 of Figure 1;

Figure 4 is a sectional view taken along the plane indicated by the arrows 4—4 of Figure 1;

Figure 5 is a sectional view taken along the plane indicated by the arrows 5—5 of Figure 1; and Figure 6 is a diagrammatic view of an installation for contacting liquid with gas or vapor, which installation includes as part thereof a plurality of the contacting chambers illustrated in Figure 1.

Referring first to Figures 1 to 4, the numeral 1 indicates a chamber, which, as clearly illustrated, is of double cone or Venturi-like shape. Said chamber 1 has an open top, and at its bottom is provided with the circumferentially spaced apertures 1a. Suspended immediately above said chamber is the deflector 2. Disposed in the bottom of the chamber 1 is the jet 3, which, as will be explained more in detail presently, is designed to fill the throat of the chamber 1 with spray, as indicated by the broken lines 5—5. The jet 3 is supplied with liquid, which commonly will be water, by the pipe 6. The deflector 2 is centered with reference to the chamber 1 by means of a plurality of radial guides 7 extending inwardly from its periphery, which guides 7 fit more or less snugly around the top of the chamber 1. Disposed on the under surface of the deflector 2 in symmetrical relationship with the Venturi-like throat of the chamber 1 is the streamlined protrusion 8, which has the function of deflecting liquid away from the center of said deflector toward the periphery thereof. Around the periphery of the deflector 2 are two coaxially disposed serrated rings or skirts, indicated by the numerals 9 and 9a, which have for their purpose the further breaking up of the fluid stream. The inner ring or skirt 9 is made up of alternate teeth and slots. The outer skirt or ring 9a is also made up of alternate teeth and slots, the teeth of the skirt 9a being staggered with respect to the teeth of the skirt 9. The under surface of the deflector 2 adjacent to the ring 9 is rounded, as indicated by the numeral 10 in Figure 1, to deflect the stream of fluid downwardly toward and between the teeth of the skirt 9.

The deflector 2 is supported by the rod 11, which is adjustable longitudinally through the relatively large hole 12 in the supporting plate 13. Attached to the plate 13 by means of bolts 14 is the casting 15 carrying a sealing gland 16, which is held in place by means of the follower 17. The upper end of the rod 11 may be provided with a squared extremity 18 above the screw-threads 19. Said screw-threads 19 pass through a threaded block 20 loosely held against turning by the yoke 21. By reason of the construction referred to, vertical adjustment of the deflector 2 is readily accomplished whereby to vary the effective opening between the chamber 1 and said deflector 2. It will be understood that the deflector 2 will act as a control valve to reduce the effective area of the exit from the chamber 1 or to completely close off such exit.

Each chamber 1 is mounted upon the plate 22, clips 23 being provided for this purpose. As shown in Figure 1, each chamber 31 extends through the plate 22 and provides communication from the lower side of said plate 22 to the upper side thereof.

The liquid inlet pipe 6 passes through an opening 24 in the plate 25. Loosely mounted upon said pipe 6 is the casting 26, which holds the sealing gland 27. Said sealing gland 27 is held in place by the ring 28, also loosely fitting upon the pipe 6. In order to hold the jet 3 in correct alignment with the chamber 1, a tapered coupling 29 is provided attached to the upper end of pipe 6. The jet 3 may be threaded into said tapered coupling 29. Said tapered coupling 29 fits into a correspondingly tapered hole in the bottom of the chamber 1, the coupling 29 and pipe 6 being held in position by means of the yoke 31, which may be clamped to the pipe 6 by means of bolts 32. Bolts 33 may be provided for holding the yoke 31 in position to cause the gland 27 to be compressed by the ring 28, thereby providing a leakproof joint. As shown in Figure 1, the casting 26 has a tapered upper extremity which fits into a correspondingly tapered hole mounted on the under side of the plate 25. The tapered hole in the plate 34 coincides with the hole 24 in the plate 25 and both of said holes are sufficiently large so that the coupling 29 may be withdrawn therethrough, thereby permitting the ready cleaning or replacement of the jet 3.

Referring now to Figure 6, an installation is shown which embodies a practical installation involving the construction above described. The numeral 35 indicates a shell which is shown as a tower. Disposed midway of the height of said tower is the plate 22. Said plate 22 may take the form of an inverted cone having its lowermost portion disposed symmetrically with respect to the tower 35. Said plate 22 supports a plurality of chambers 1. It will be understood that said chambers 1 are disposed circumferentially with respect to the tower 35. Said plate 22 divides the tower into two chambers, one located below and the other above said plate 22. The lowermost of said chambers is indicated by the numeral 36 and the uppermost is indicated by the numeral 36a. Each of the chambers 36 and 36a will preferably be of sufficient size to enable a man to get inside for the purpose of adjusting the positions of the deflectors 2—2 and also to remove the jets 3 for cleaning. Manholes 37 are provided for permitting access to each of said chambers 36 and 36a.

The numeral 38 indicates a gas inlet pipe, which communicates with the lower chamber 36. The numeral 39 indicates an outlet pipe for gas or vapor which has passed through the tower 35.

The numeral 40 indicates a pipe line for liquid which leads to the various pipes 6—6 cooperating with the various chambers 1—1. The numeral 41 indicates a water meter, and the numeral 42 indicates a by-pass for said meter. The numeral 43 indicates a pipe through which water delivered from the chambers 1—1 is led to a region near the bottom of the tower 35. The numeral 44 indicates the normal water level in the bottom of the tower 35. This water level is maintained by means of the pipe 45 through which water overflows through the pipe 46 to maintain said level 44. In the upper part of the tower 35 is the moisture eliminating section 47, which may be of any of the designs well known to those skilled in the art. Cleaning jets 48 are also shown and may be used when necessary. Jets 49—49 may be provided in the chamber 36 for giving a preliminary wetting to the gas entering said chamber 36 from the inlet connection 38. In order to have clean water for delivery to the installation, a filter 50 is illustrated in Figure 2. A pump 51 is also shown for delivering water to said filter.

While the chambers 1—1 have been illustrated in upright positions, it will be understood that this position may be varied, inasmuch as the flow of gas can be at any preferred angle.

Referring now to the operation of the above described embodiment of the present invention, it has been found that, in the cleaning of gases containing a high concentration of dust, if the velocities of the gas and the water are kept nearly the same, the resulting pressure drop through the installation is satisfactory. It is possible in some instances to entrain all of the gas that passes through each chamber 1 and thus eliminate pressure drop. It may be noted at this time that the gas entering the openings 1a of each chamber 1 will have a modifying effect upon the cone of spray delivered by the jet 3. The jet 3 should be so designed relative to the flow of gas that the resulting spray will completely fill the Venturi throat of the chamber 1. It will be understood, of course, that the cone emerging from each jet 3 will be completely filled with spray.

The cone of spray completely fills the area of the Venturi-like throat of each chamber 1 and thus prevents any gas from passing through the chamber 1 without intimate contact with said spray.

The deflector 2 has a very important function. Said deflector is large enough in diameter to allow the full extent of the cone of mixed gas and water to strike within its periphery. By reason of the streamlining of the lower surface of each deflector, the stream of gas and liquid is diverted radially with reference to the axis of the jet 3 and then downwardly into contacting relationship with the teeth of the serrated skirts 9 and 9*a*. The streamlined construction of the deflector 2 prevents an accumulation of a mass of liquid which might drop back and interfere with the action of the chamber 1. The umbrella-like stream of gas and liquid is deflected by the deflector 2 so that it crosses through the serrated edge of the depending skirt 9 at a downwardly sloping angle. The teeth of both of the skirts 9 and 9*a* will be sufficiently long so that the stream of gas and liquid will pass through the teeth of said skirts rather than below them.

It will be noted from the design of the deflector 2 that the stream of gas and liquid will have the same turbulence as that experienced when making a right-angle bend in a pipe line, it being established that turbulence is materially increased in a turn of this kind. After the gas and liquid stream makes the right-angle turn adjacent to the part 8, it is again deflected in a downwardly direction by the small curve indicated by the numeral 10 on Figure 1, thus causing further turbulence. This deflection through the serrated skirt has the effect of causing the wetted particles to continue their downwardly course, whereas the gas itself loses its velocity due to the increase in area and thus has less tendency to carry the entrained particles upwardly with it.

It will be understood that the skirts 9 and 9*a* may take other forms, as for example perforated plates or screens or inclined conical rings, to accomplish the purpose intended.

By reason of the adjustability of each deflector 2 relative to its chamber 1, the advantage is had that the flow through any or all of the chambers 1—1 may be controlled. By adjustment of the deflector 2, the degree of contact of the gas with the liquid may be controlled whereby, for example in the case of gas cleaning, the extent of the elimination of impurities may be controlled in accordance with the amount of pressure that the operator can afford to lose.

As indicated above, it is advantageous in most instances to maintain the same velocity in the gas stream through the chamber 1 and in the flow of liquid issuing from the jet 3, although the present invention will have decided advantages if the speed of water is somewhat less than the speed of gas. Under certain conditions it will be found desirable to increase the velocity of the water as compared with the velocity of the gas in order to cause sufficient entrainment by the water to balance the friction of the gas stream through the chamber, the result being a reduction in pressure drop to even as low as zero. Such a reduction in the pressure drop in the gas passing through the chamber 1 will have the effect of increasing the capacity of the installation to a very material extent.

One of the advantages of the present invention is that overloads may be taken care of without material decrease in the quality of dust removal. This advantage results from the fact that sufficient liquid spray is provided to properly fill the Venturi-like neck of the chamber 1. Therefore, even under overload conditions excellent wetting of the particles in the gas stream will be accomplished. By reason of this advantage the equipment may be designed for normal operating load rather than being designed with a large factor of safety to take care of overloads.

Referring now to specific figures, it has been found that for best results a gas velocity of not less than 6000 feet per minute, measured at the smallest diameter of the Venturi-like neck of the chamber 1, is desirable. In certain tests of physical embodiments of the present invention, water pressure of 125 pounds or more per square inch is required to correspond to this gas velocity. One of the most satisfactory tests with apparatus as above described was made at the rate of 8000 feet per minute for the gas with a water pressure of 140 pounds per square inch. Under the conditions just referred to, the water used approximated 9 gallons per thousand cubic feet of gas passing through the chamber 1. The water at the jet 3 had a velocity somewhat above 6000 feet per minute.

Tests have been made to determine the most desirable shape of chamber 1. Numerous tests finally developed the fact that a Venturi type of throat with the outgoing included angle at approximately 30 deg. and the incoming angle of the water jet the same angularity was the most advantageous, as the water spray completely filled the throat of the chamber and also continued out through the enlarged end of the chamber, filling it likewise.

As a means of testing results, a foundry dust was used containing a considerable portion of material running from 2 to 10 microns in size. As the water velocity was increased up to the order of 125 pounds or more per square inch, thereby increasing the jet velocity to from 6000 to 8000 feet per minute, measured at the jet opening, it was found that this increased pressure resulted in such a fine dispersion of the water that no difficulty was encountered in wetting the micron particles of the dust; in fact, some of the experiments showed a reduction in the two to ten micron count from 600,000,000 to 3,000,000 per cubic foot.

It will be understood, of course, that though it is at present preferred to contact the liquid and gas in a chamber having a double cone or Venturi-like throat, the water being delivered from a jet, the invention is sufficiently broad in its scope to include the contacting of finely divided liquid and air flowing at high velocity or velocities in the same direction regardless of how the spray of liquid is initiated. The greatest advantages of the present invention will be attained provided that the velocity of the gas and spray is maintained at or above approximately 6000 feet per minute at the time of contacting with one another, and provided that proper impinging follows to knock down the wet dust after such passage.

It has been found that where the gas enters the chamber 1 at a temperature on the order of 150 to 200 deg. F., the cleaning is very much improved over lower temperatures. An advantage of the present invention which has been discovered is that there is almost instantaneous transfer of the heat of the gas to the water. This results in a material reduction in the volume of gas discharged from the chamber 1 and has a considerable influence in reducing pressure drop through the chamber 1. Accordingly, in the cleaning of dirty gas the temperature of the incoming gas should be as high as practicable.

It is generally accepted that the cooling of a hot gas by water spray is a difficult operation if the temperature of the gas is to be brought into close relationship with the temperature of the cooling water. This is probably due to the improper atomization and improper contact of the water with the gas. In other words, bubbles of gas may make their way through the water spray without being broken up and cooled to their cores. It has been discovered that in the practice of the present invention, where the gas is introduced at a temperature of approximately 150 deg. F. and cooling water is introduced at a temperature of approximately 81 deg. F., the outlet gas temperature is approximately 84 deg. F.

An important feature of the present invention is that the gas and air pass through the apparatus in the same direction.

In the description appearing hereinabove, the term "gas" is used in its broad sense and is intended to cover air and other gaseous fluids such as steam, oil vapors and other chemical vapors. When used for this purpose the intimate contact desired may, according to the present invention, be obtained at considerably less pressure of the liquid than that required for a thorough cleaning of the gases. For example, in its functions as a contacting condenser, a material reduction in the amount of liquid required is had relative to installations heretofore known and used. It thus becomes possible to use the device of the present invention for direct contacting of cooling water with steam and thereafter cooling a portion of the mixture of condensed steam and water by passing it through a surface cooler and finally returning the condensate to the jets 3. The condensed steam is thereby kept free at all times from contaminating water. A further advantage of the present invention in this connection is the fact that the transfer of heat between two liquids is much more rapid than between vapor and liquid, and therefore the preliminary treatment of steam according to the present invention which will result in the condensation thereof has the advantage that the size of surface coolers can be materially decreased from present practice.

By reason of the very low or zero pressure drop in the apparatus according to the present invention, the present invention is particularly applicable to vacuum distillation.

In short, the present invention has for its purpose improved contact between gases and vapors and liquids. An important use is for the elimination of finely divided dust particles. Others are for heat transfer between liquids and gases or vapors; for absorption of gases or vapors by liquids; for the fractionating of gases or vapors by liquids; for air conditioning; and for various chemical processes.

A velocity of 6000 feet per minute of the gas and spray has been referred to as being most advantageous. This statement has particular reference to the removal of dust on the order of less than ten microns in size, which is one of the main objects of the present invention. However, where complete dust removal is not required, satisfactory results have been obtained with as low as 2000 feet per minute velocity of the water leaving the jet. Under these conditions the air velocity may or may not be reduced, depending on the circumstances.

Though a certain preferred embodiment of the present invention has been described in detail, many modifications will occur to those skilled in the art. It is intended to cover all such modifications that fall within the scope of the appended claims.

What is claimed is—

1. In apparatus for contacting gas with liquid, in combination, means providing a chamber having a passage therethrough, said passage having a neck, a jet for directing a cone of spray into said neck, said chamber having apertures for directing gas into said chamber around said jet, said jet being designed to completely fill said neck with said spray even when said gas is being directed in said chamber at operative velocities, and deflecting means at the other end of said passage for directing spray radially with respect to the axis of said neck, said deflecting means having a smoothly curving surface for spreading the resulting mixture radially with respect to the axis of said neck.

2. In apparatus for contacting gas with liquid, in combination, means providing a chamber having a Venturi-like passage therethrough, said passage having a neck, a jet for directing a cone of spray into said neck, said chamber having apertures for directing gas into said chamber around said jet, said jet being designed to completely fill said neck with said spray even when said gas is being directed in said chamber at operative velocities, and deflecting means at the other end of said passage for directing the resulting mixture radially with respect to the axis of said neck, said deflecting means having a smoothly curving surface for spreading said mixture radially with respect to the axis of said neck, said deflecting means having longitudinally extending abutment means adapted to be engaged by said radially directed spray.

3. In apparatus for contacting gas with liquid, in combination, means providing a chamber having a passage therethrough, said passage having a neck, a jet for directing a cone of spray into said passage, said chamber having apertures for directing gas into said chamber around said jet, said jet being designed to completely fill said neck with said spray even when said gas is being directed in said chamber at operative velocities, and deflecting means at the other end of said passage for directing the resulting mixture radially with respect to the axis of said neck, said deflecting means having a smoothly curving surface for spreading said mixture radially with respect to the axis of said neck, said deflecting means having longitudinally extending abutment means adapted to be engaged by said radially directed mixture, said longitudinally extending abutment means including an apertured flange.

4. In apparatus for contacting gas with liquid, in combination, means providing a chamber having a passage therethrough, said passage having a neck, a jet for directing a cone of spray into said passage, said chamber having apertures for directing gas into said chamber around said jet, said jet being designed to completely fill said neck with said spray even when said gas is being directed in said chamber at operative velocities, and deflecting means at the other end of said passage for directing the resulting mixture radially with respect to the axis of said neck, said deflecting means having a smoothly curving surface for spreading said mixture radially with respect to the axis of said neck, said deflecting means having longitudinally extending abutment means adapted to be engaged by said radially directed mixture, said longitudinally extending abutment means comprising a pair of coaxial apertured flanges, the apertures of one of said flanges being staggered with respect to the apertures of the other of said flanges.

5. In apparatus for contacting gas with liquid, in combination, means providing a chamber having a passage therethrough, said passage having a neck, a jet for directing a cone of spray into said passage, said chamber having apertures for directing gas into said chamber around said jet, said jet being designed to completely fill said neck with said spray, and deflecting means at the other end of said passage for directing the resulting mixture radially with respect to the axis of said neck, and adjustment means for adjusting said deflecting means longitudinally with respect to said chamber to vary the effective area of exit from said chamber.

6. In apparatus for contacting gas with liquid, in combination, means providing a chamber having a passage therethrough, said passage having a neck, a jet for directing a cone of spray into said passage, said chamber having apertures for directing gas into said chamber around said jet, said jet being designed to completely fill said neck with said spray even when said gas is being directed in said chamber at operative velocities, and deflecting means at the other end of said passage for directing the resulting mixture radially with respect to the axis of said neck, said deflecting means having a smoothly curving surface for spreading said spray radially with respect to the axis of said neck, and adjustment means for adjusting said deflecting means longitudinally with respect to said chamber to vary the effective area of exit from said chamber.

7. In apparatus for contacting gas with liquid, in combination, means providing a chamber having a Venturi-like passage therethrough, a jet for directing a cone of spray into said passage, said chamber having apertures for directing gas into said chamber around said jet, said jet being designed to completely fill the neck of said Venturi-like passage with said spray even when said gas is being directed in said chamber at operative velocities, and deflecting means at the other end of said passage for directing the resulting mixture radially with respect to the axis of said neck, said deflecting means having a smoothly curving surface for spreading said mixture radially with respect to the axis of said neck, said deflecting means having longitudinally extending abutment means adapted to be engaged by said radially directed mixture, and adjustment means for adjusting said deflecting means longitudinally with respect to said chamber to vary the effective area of exit from said chamber.

8. In apparatus for contacting gas with liquid, in combination, means providing a chamber having a Venturi-like passage therethrough, a jet for directing a cone of spray into said passage, said chamber having apertures for directing gas into said chamber around said jet, said jet being designed to completely fill the neck of said Venturi-like passage with said spray even when said gas is being directed in said chamber at operative velocities, and deflecting means at the other end of said passage for directing the resulting mixture radially with respect to the axis of said neck, said deflecting means having a smoothly curving surface for spreading said mixture radially with respect to the axis of said neck, said deflecting means having longitudinally extending abutment means adapted to be engaged by said radially directed mixture, said longitudinally extending abutment means including an apertured flange, and adjustment means for adjusting said deflecting means longitudinally with respect to said chamber to vary the effective area of exit from said chamber.

9. In apparatus for contacting gas with liquid, in combination, means providing a chamber having a Venturi-like passage therethrough, a jet for directing a cone of spray into said passage, said chamber having apertures for directing gas into said chamber around said jet, said jet being designed to completely fill the neck of said Venturi-like passage with said spray even when said gas is being directed in said chamber at operative velocities, and deflecting means at the other end of said passage for directing the resulting mixture radially with respect to the axis of said neck, said deflecting means having a smoothly curving surface for spreading said mixture radially with respect to the axis of said neck, said deflecting means having longitudinally extending abutment means adapted to be engaged by said radially directed mixture, said longitudinally extending abutment means comprising a pair of coaxial apertured flanges, the apertures of one of said flanges being staggered with respect to the apertures of the other of said flanges, and adjustment means for adjusting said deflecting means longitudinally with respect to said chamber to vary the effective area of exit from said chamber.

10. In apparatus for contacting gas with liquid, a housing, a dividing plate within said housing, a plurality of chambers extending through said plate, each of said chambers having a passageway therethrough, said passageway having a neck, means for admitting gas to said housing below said plate, each of said chambers having apertures circumferentially disposed therein for admitting gas thereto, jet means cooperating with each of said chambers for directing a conical spray of liquid to completely fill the neck of each of said chambers even when gas is being admitted to the corresponding chambers at operative velocities, each of said chambers having an outlet opening and deflecting means for deflecting fluid flow radially thereof, and a pipe for drawing off liquid from said plate.

11. In apparatus for contacting gas with liquid, a housing, a dividing plate within said housing, a plurality of chambers extending through said plate, each of said chambers having a passageway therethrough, said passageway having a neck, means for admitting gas to said housing below said plate, each of said chambers having apertures circumferentially disposed therein for admitting gas thereto, jet means cooperating with each of said chambers for directing a conical spray of liquid to completely fill the neck of each of said chambers even when gas is being admitted to the corresponding chambers at operative velocities through said apertures, each of said chambers having an outlet opening and deflecting means for deflecting fluid flow radially thereof, and a pipe for drawing off liquid from said plate, each of said deflecting means being independently adjustable longitudinally with respect to its corresponding chamber.

12. The method of contacting gas with liquid which consists in directing a spray of liquid at high velocity, directing gas into said spray in the same general direction as the direction of movement of said spray, and deflecting the flow of the resulting fluid mixture laterally in umbrella-like formation with respect to the original direction of movement of said spray and then deflecting said fluid mixture reversely with respect to the original direction of movement of said spray.

13. The method of contacting gas with liquid which consists in directing a spray of liquid in flaring conical formation, forcing the gas to be treated into said conical formation of spray at a velocity at least equal to the velocity of said liquid at the region where said conical formation starts.

14. The method of contacting gas with liquid which consists in directing a spray of liquid in flaring conical formation, forcing the gas to be treated into said conical formation of spray at a velocity at least equal to the velocity of said liquid at the region where said conical formation starts, the velocity of the resulting mixture of gas and liquid at the point of its maximum velocity being at least equal to 6000 feet per minute.

15. The method of contacting gas with liquid which consists in directing a spray of liquid in conical formation with a Venturi-like action, and forcing the gas to be treated into said spray, the velocity of said mixture in the neck portion of said Venturi-like action being at least equal to 6000 feet per minute.

16. The method of contacting gas with liquid which consists in directing a spray of liquid in conical formation with a Venturi-like action, forcing the gas to be treated into said spray, the velocity of said mixture in the neck portion of said Venturi-like action being at least equal to 6000 feet per minute, and deflecting the resulting fluid mixture laterally with respect to the axis of said Venturi-like action.

17. The method of contacting gas with liquid which consists of directing said gas at high velocity into a stream of finely divided liquid in spray form, said gas and liquid flowing in the same general direction, and subjecting the combined stream of liquid spray and gas to impingement to thoroughly wet dust particles in said stream, deflecting a flow of said liquid spray and gas laterally in umbrella-like formation with respect to the original direction of movement of said finely divided liquid and then deflecting said mixture reversely with respect to the original direction of movement of said finely divided liquid.

18. The method of contacting gas with liquid which consists of directing said gas at high velocity into a stream of finely divided liquid in spray form, said gas and liquid flowing in the same general direction, the velocity of said liquid and gas stream at its maximum point being at least as great as approximately 6000 feet per minute, deflecting a flow of said liquid spray and gas laterally in umbrella-like formation with respect to the original direction of movement of said finely divided liquid and then deflecting said mixture reversely with respect to the original direction of movement of said finely divided liquid.

19. The method of contacting gas with liquid which consists of directing said gas and a stream of finely divided liquid in spray form in intimate contact, said gas and liquid flowing in the same general direction at high velocity, and subjecting the combined stream of liquid spray and gas to impingement to thoroughly wet dust particles in said stream, deflecting a flow of said liquid spray and gas laterally in umbrella-like formation with respect to the original direction of movement of said finely divided liquid and then deflecting said mixture reversely with respect to the original direction of movement of said finely divided liquid, the velocity of said liquid and gas stream at its maximum point being at least as great as approximately 6000 feet per minute.

20. The method of removing dust or other solids from a body of gas by contact with liquid which consists in mixing said gas with said liquid at a high velocity while said gas and said liquid are flowing in approximately the same direction and impinging the mixture of gas and liquid, deflecting the flow of the resulting fluid mixture laterally in umbrella-like formation with respect to the original direction of movement of said liquid and then deflecting said fluid mixture reversely with respect to the original direction of movement of said liquid to remove wetted solids and particles of liquid from said gas, said velocity of the gas and liquid stream at its maximum point being not less than 6000 feet per minute.

GILBERT D. DILL.